US009081579B2

(12) United States Patent
Sharrma et al.

(10) Patent No.: US 9,081,579 B2
(45) Date of Patent: Jul. 14, 2015

(54) SYSTEM AND METHOD FOR MOBILE APPLICATION DEVELOPMENT

(75) Inventors: Rakesh Sharrma, New Delhi (IN); Sujoy Bhattacharjee, San Carlos, CA (US); Akira Miyata, Tokyo (JP)

(73) Assignee: MOBILOUS INC., Los Altos, CA (US)

( * ) Notice: Subject to any disclaimer, the term of this patent is extended or adjusted under 35 U.S.C. 154(b) by 257 days.

(21) Appl. No.: 13/443,604

(22) Filed: Apr. 10, 2012

(65) Prior Publication Data

US 2012/0284686 A1 Nov. 8, 2012

Related U.S. Application Data

(60) Provisional application No. 61/474,093, filed on Apr. 11, 2011.

(51) Int. Cl.

*G06F 9/44* (2006.01)
*G06F 9/445* (2006.01)

(52) U.S. Cl.

CPC .. *G06F 8/36* (2013.01); *G06F 8/34* (2013.01); *G06F 8/38* (2013.01); *G06F 8/64* (2013.01); *G06F 8/76* (2013.01); *G06F 9/4446* (2013.01); *G06F 9/4448* (2013.01); *G06F 8/20* (2013.01); *G06F 8/30* (2013.01)

(58) Field of Classification Search

CPC ............... G06F 8/34; G06F 8/37; G06F 8/20; G06F 9/44; G06F 8/30; G06F 8/64; G06F 9/4446; G06F 9/4448

See application file for complete search history.

(56) References Cited

U.S. PATENT DOCUMENTS

| | | | | |
|---|---|---|---|---|
| 5,875,333 | A * | 2/1999 | Fish et al. | 717/109 |
| 7,644,391 | B2 * | 1/2010 | Fisher et al. | 717/109 |
| 7,913,223 | B2 * | 3/2011 | Taber, III | 717/106 |
| 8,924,934 | B2 * | 12/2014 | Sullivan et al. | 717/124 |
| 2002/0085033 | A1 * | 7/2002 | Robinson et al. | 345/762 |
| 2002/0108101 | A1 * | 8/2002 | Charisius et al. | 717/105 |
| 2003/0093764 | A1 * | 5/2003 | Devins et al. | 716/5 |
| 2003/0140332 | A1 * | 7/2003 | Norton et al. | 717/106 |
| 2004/0006608 | A1 * | 1/2004 | Swarna et al. | 709/220 |
| 2004/0268229 | A1 * | 12/2004 | Paoli et al. | 715/508 |
| 2005/0102612 | A1 * | 5/2005 | Allan et al. | 715/513 |
| 2005/0289195 | A1 * | 12/2005 | Lehtola et al. | 707/204 |
| 2009/0083700 | A1 * | 3/2009 | MacPhail | 717/107 |
| 2009/0178007 | A1 * | 7/2009 | Matas et al. | 715/835 |
| 2009/0254877 | A1 * | 10/2009 | Kuriakose et al. | 717/105 |
| 2010/0085599 | A1 * | 4/2010 | Nomura | 358/1.15 |
| 2010/0138479 | A1 * | 6/2010 | Zhu | 709/203 |
| 2010/0217747 | A1 * | 8/2010 | Vitanov et al. | 707/621 |
| 2011/0035706 | A1 * | 2/2011 | Kinoshita et al. | 715/835 |
| 2011/0154287 | A1 * | 6/2011 | Mukkamala et al. | 717/105 |
| 2012/0179986 | A1 * | 7/2012 | Zhang et al. | 715/762 |

OTHER PUBLICATIONS

Judith Bishop, Multi-platform User Interface Construction—A Challenge for Software Engineering-In-the-Small, 2006, pp. 751-758.*

(Continued)

*Primary Examiner* — Thuy Dao
*Assistant Examiner* — Mongbao Nguyen
(74) *Attorney, Agent, or Firm* — Arent Fox LLP

(57) ABSTRACT

The present invention relates to the field of mobile applications and, more specifically, to a system and method for building a mobile application in a mobile application development environment in a simple and cost effective manner.

6 Claims, 11 Drawing Sheets

Binary Generator
Mobile application builder
ADF files
MobileWeb generator
Android generator
iOS generator
Other platform generator
HTML5 files for MobileWeb
APK binary files for android
IPA binary files for iOS device
APP binary files with launch script for iOS sim
binary files for the platform

(56) References Cited

OTHER PUBLICATIONS

Reto Meier, Android Application Development, 2009, pp. 30-37 and 76-107.*

Judth Bishop, Cross-Platform Development: Software that Lasts, 2006, pp. 26-34.*

European Search Report dated Mar. 24, 2014 issued in European Patent Application No. 12 77 1982.1.

Hartmann, Gustavo et al: "Cross-platform mobile development", Mar. 1, 2011, pp. 1-18, XP055107857, Retrieved from the Internet on Mar. 14, 2014.

Kaltofen, Sandra: "Design and implementation of an end-user programming software system . . . ", Linnaeus University—School of Computer Science, Physics and Mathematics—Reports, Nov. 9, 2010, pp. 1-75, XP055106145, retrieved from the Internet on Mar. 7, 2014.

Michotte, Benjamin et al.: "GrafiXML, a Multi-Target User Interface Builder Based on UsiXML", Autonomic and Autonomous Systems, 2008. ICAS 2008. Fourth International Conference on, IEEE, Piscataway, NJ, USA, Mar. 16, 2008, pp. 15-22.

Wolber, David: "Using Google App Inventor to Design Mobile Applications", University of San Francisco—Tutorials on line, Nov. 3, 2010, pp. 1-30, XP055105785, Retrieved from the Internet on Mar. 5, 2014.

* cited by examiner

SYSTEM AND METHOD FOR MOBILE APPLICATION DEVELOPMENT

FIELD OF THE INVENTION

The present invention relates to the field of mobile applications. More particularly, the present invention relates to a system and method for building a mobile application development environment that enables development of multi-platform mobile applications.

BACKGROUND OF THE INVENTION

In general, an application development environment is used to develop mobile applications that run on mobile phones. Conventional mobile application development environments available in the market are very complex to use and are also very expensive. Further, these application development environments do not have the option to develop applications to multi-platform mobile devices. Also, the existing environments can be used only by a user who is technically skilled in software coding, as the codes are required to build a mobile application. Unless the person is skilled in software coding, it is a difficult task for a user to build such mobile applications.

Further, designing a mobile that is cost effective and user friendly is another difficult task due to different types and skilled levels of users. Further, different types of features have to be available to a user in order to make use of them to build a mobile application. Also, the various steps involved in creating and designing an application must not be monotonous and time consuming. In addition, the user must also have the option of having a preview of the application that is being built. However, the existing mobile application development environments do not have the preview feature.

Many applications for use in mobile devices are being built for use by individual users as well as by small and medium businesses/enterprises. This opportunity is opening up as they queue up to access the mobile value chain to provide products and services to their existing clients and as well as to the new clients. Small and medium businesses/enterprises conversion to mobile transaction models is 15% currently. It is an opportunity to be tapped. Moreover, device manufacturers have 95% applications in non-revenue model. This is also a significant conversion opportunity.

Further, small and medium businesses/enterprises transiting to using mobile applications for their products and services by using cost-effective third party solutions is the opportunity worldwide. The enterprises will continue to push for cost-effective solutions that maximize business benefits that are tangible or intangible. Hence, the mobile application solutions are a huge potential to be tapped.

Therefore, there always existed a need to build a completely automated mobile ecosystem independent of device manufacturers that allows application building mobile applications by using a wizard based environment and drag and drop feature. This feature makes the mobile application development environment simple and cost effective. Also, there exists a need to build a simulator in order to assist the user to depict the real time development of the mobile application that is being built.

OBJECT OF THE INVENTION

The main object of the present invention is to provide cost effective and less time consuming system and a method for building a mobile application development environment that enables development of mobile applications

SUMMARY OF THE INVENTION

Accordingly, the present invention provides a method for creating an application for execution on mobile devices, said method comprising the steps of:

a. providing a wizard based environment to a user and allowing the user to interact with the wizard to create at least one user interface page for the application;

b. detecting an input from the user indicative of completion of the application creation;

c. automatically creating a definition file for the application thus created, said definition file comprising definitions regarding user interface page hierarchy, user interface page(s), user interface object(s), action(s), device setting(s) and region; and d. combining the contents of the definition file with an operating system specific run-time file to generate an application file.

In an embodiment of the present invention, the wizard based environment allows the user to create said at least one user interface page for the application using a drag-and-drop function.

In another embodiment of the present invention, the step of automatically creating definition file for the application comprises:

(a) automatically detecting user interface objects that are defined by the user on the said one or more user interface pages of the application;

(b) automatically detecting regions that define GPS location regions for GPS application events used by the application;

(c) automatically detecting device settings which defines initial settings for each device like GPS, watch or accelerometer used by the application;

(d) if application contains plurality of user interface pages, automatically detecting hierarchy between the plurality of user interface pages;

(e) in respect of each of the user interface page, automatically detecting the user interface page setting;

(f) in respect of each of the user interface page, automatically detecting functionality contained in the user interface page;

(g) in respect of each of the user interface page, automatically detecting actions to be orchestrated for each event triggered from the User Interface or from the device; and (h) automatically writing software codes corresponding to the items detected in (a) to (g).

In yet another embodiment of the present invention, the step of combining the contents of the definition file with an operating system specific run-time file comprises:

(a) preparing libraries necessary for linking;

(b) receiving the definition file in an compiler environment; and (c) linking at least a part of the definition file and the libraries by a binary generator to generate the application file.

In still another embodiment, the method of the present invention further comprises, if characteristics of a particular mobile device are not compatible with the contents of the definition file, providing a wizard based environment to a user and allowing the user to interact with the wizard to modify the contents of the definition file.

The present invention also provides an apparatus for creating an application for execution on mobile devices, said apparatus comprising:

a module (401) configured to:

provide a wizard based environment to a user and allowing the user to interact with the wizard to create at least one user interface page for the application;

detect an input from the user indicative of completion of the application creation; and automatically create a definition file for the application thus created, said definition file comprising definitions regarding user interface page hierarchy, user interface page(s), user interface object(s), action(s), device setting(s) and region; and a binary generator module (402) for combining the contents of the definition file with an operating system specific run-time file to generate an application file.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION

Figure 1:
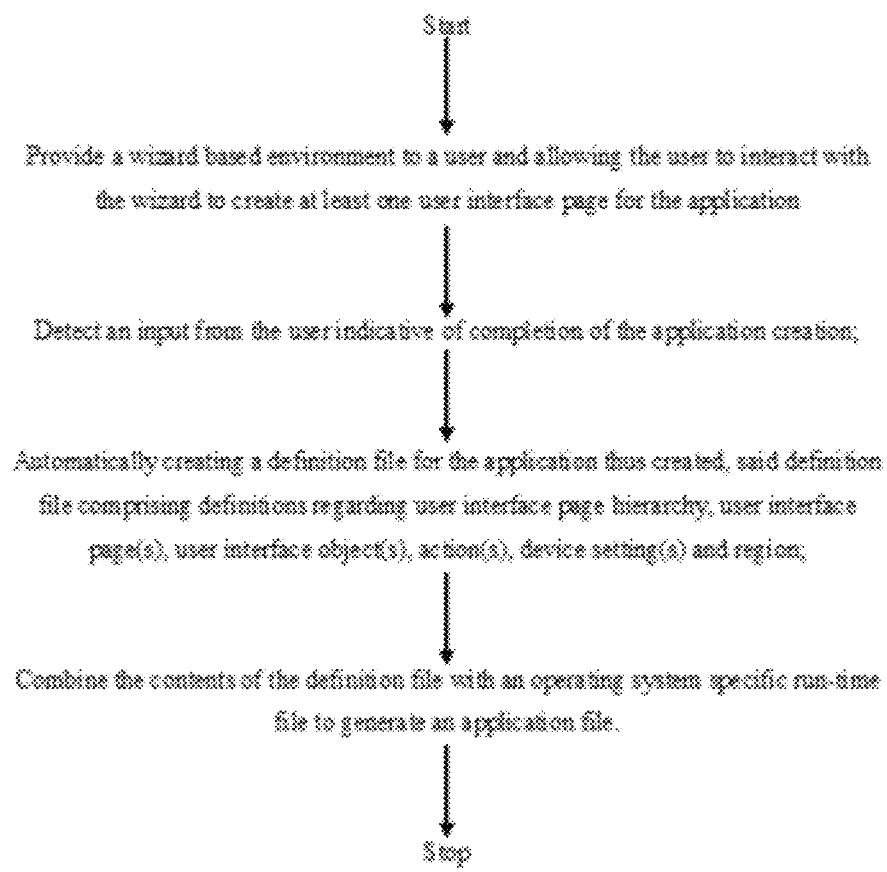
FIG. 1 represents the flow chart describing the mobile application development method in accordance with the teachings of the present invention.

Before describing in detail embodiments that are in accordance with the present invention, it should be observed that the method steps and construction of the corresponding apparatus implementing the method steps have been represented where appropriate by conventional symbols in the drawings, showing only those specific details that are pertinent to understanding the embodiments of the present invention so as not to obscure the disclosure with details that will be readily apparent to those of ordinary skill in the art having benefit of the description herein The terms “comprises”, “comprising”, or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by “comprises . . . a” does not, without more constraints, preclude the existence of other elements or additional elements in the system or apparatus.

The present invention relates to a system and a method for building a unique wizard based mobile application environment for automatically building mobile applications. This environment allows any small and medium businesses/enterprises to automatically build applications in a simple, cost effective and less time consuming manner. More significantly, the environment enables building of several mobile applications by automatically generating codes thereby allowing even an unskilled person to use and build mobile applications. This application development environment will drastically reduce the cost and un-necessary complications that occur during outsourcing to third parties. The application is built in a wizard based environment which is very easy. Users using this application can completely build a mobile application by merely defining their requirements and by simply clicking the next button present in the plurality of screens that appear in the application development environment. Further, as users start building their application, they can simultaneously view their application in real time using a simulator.

Referring to FIG. 1, the present invention provides a computer based method for creating an application for execution on mobile devices, said method comprising the steps of:

(a) providing a wizard based environment to a user and allowing the user to interact with the wizard to create at least one user interface page for the application (step 101);

(b) detecting an input from the user indicative of completion of the application creation (step 103);

(c) automatically creating a definition file for the application thus created, said definition file comprising definitions regarding user interface page hierarchy, user interface page(s), user interface object(s), action(s), device setting(s) and region (step 105); and (d) combining the contents of the definition file with an operating system specific run-time file to generate an application file (step 107).

Figure 2:
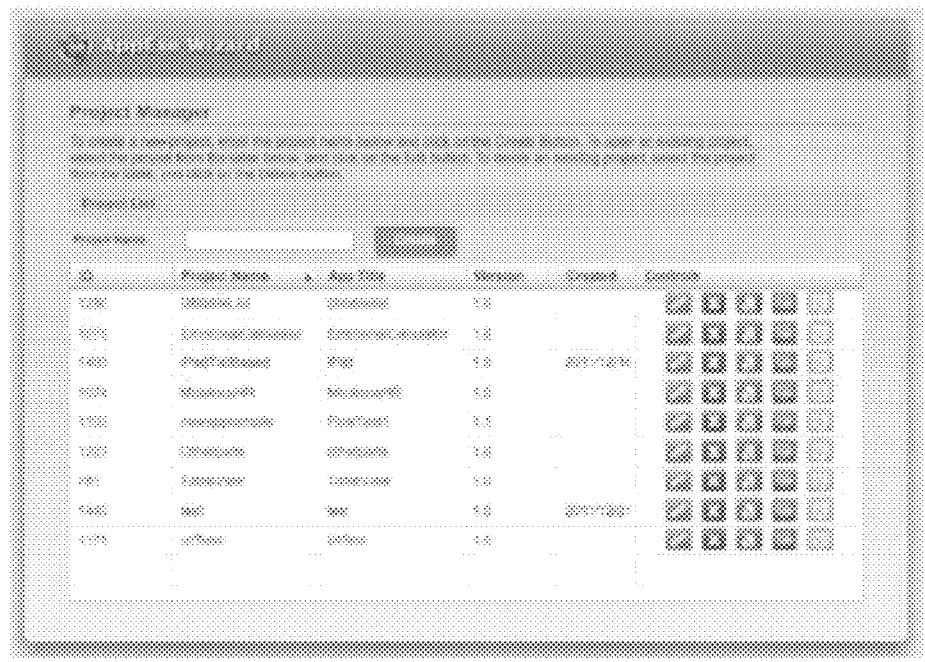
FIG. 2 illustrate screenshot of the project manager user interface that forms part of the wizard based environment that assists the user in creating at least one user interface page for the application.

It can be noticed that as per step (101), there is provided a wizard based environment which assists the user to more efficiently create the mobile application which comprises at least one user interface page. Referring to FIGS. 2 to 13, various sections of the wizard based environment are illustrated. To begin with, the wizard based environment provides a project manager user interface as illustrated in FIG. 2, using which a new Project can be named and created, which constitutes the starting point of defining a mobile application. The Project Manager also allows for updating an existing Project, deleting an existing Project or cloning a Project which is just the process of creating a duplicate copy of an existing project but with a new name. Also from the Project Manager, a Project can be published to a public mobile application store or online mobile application marketplace, and a newly-built project can be checked for completeness before the process of submission for publishing to a public mobile application store or online mobile application marketplace.

Figure 3:
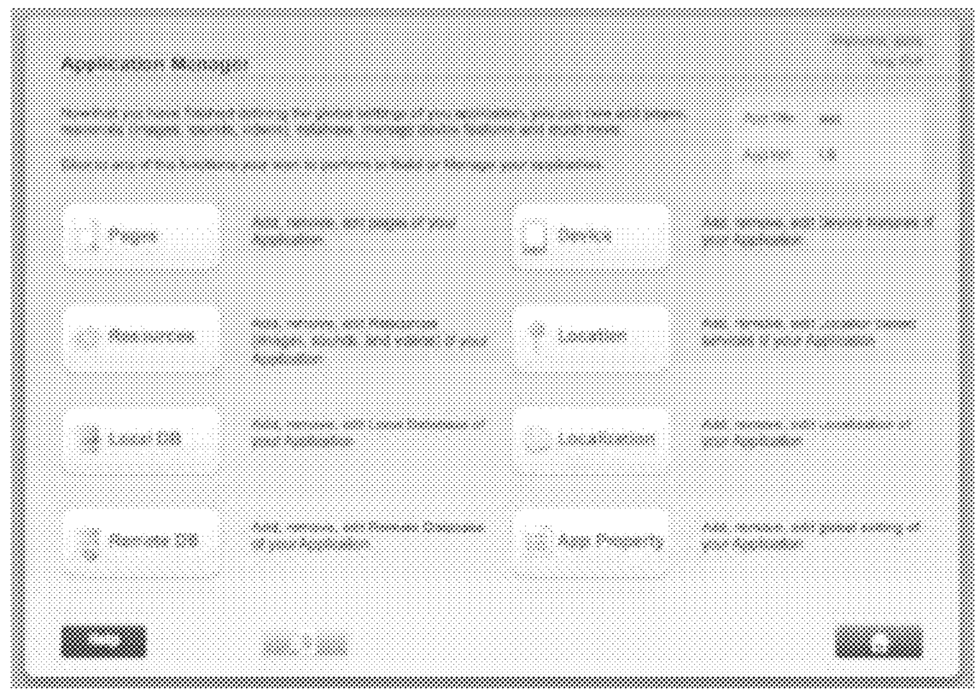
FIG. 3 illustrate screenshot of the application manager user interface that forms part of the wizard based environment that assists the user in creating at least one user interface page for the application.

Referring to FIG. 3, the application manager user interface is the nodal point of the wizard based mobile application development environment for a specific Project. It consists of following components—The Page Manager, the Resource Manager, the Database Manager, the Device Manager, the Location Manager, The Localization Manager and the Application Property Manager. The Localization Manager is the component of the wizard based mobile application development environment that can be used to convert all text appearing in the application from one language to another language. The Localization Manager automatically recognizes all text appearing in the application and suggest to the developer equivalent terms for the text in another language (as chosen by the developer) and prompts the developer to choose amongst the suggested options or input his own equivalent term. Once the developer has chosen a translated word for a particular word, the Localization Manager automatically replaces the original word by the developer chosen word (which is in other language). The Application Property Manager is a component of the wizard based mobile application development environment that can be used to define settings that apply to the entire mobile application and not just to any specific page or device feature. The options chosen by the developer gets applied to the all pages of the mobile application.

Figure 4:
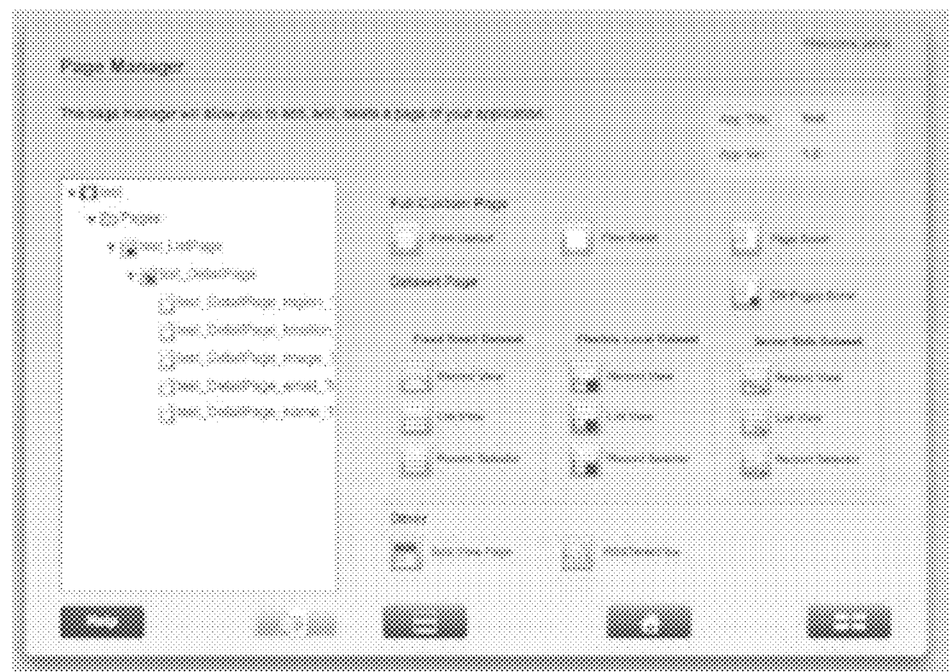
FIG. 4 illustrate screenshot of the page manager user interface that forms part of the wizard based environment that assists the user in creating at least one user interface page for the application.

Referring to FIG. 4, the Page Manager is a component of the wizard based mobile application development environment that helps define the hierarchy of pages that will constitute the mobile application, as well as the detailed specification of each page for a specific Project. The user can choose the type of page from the available options free layout, free scroll, or page scroll, or one of the database-driven page types, and put the page with the page type thus chosen at the appropriate level in the page hierarchy. The user can then drill down into the newly defined page, to use the Page Editor component to define each part of the page.

Figure 5:
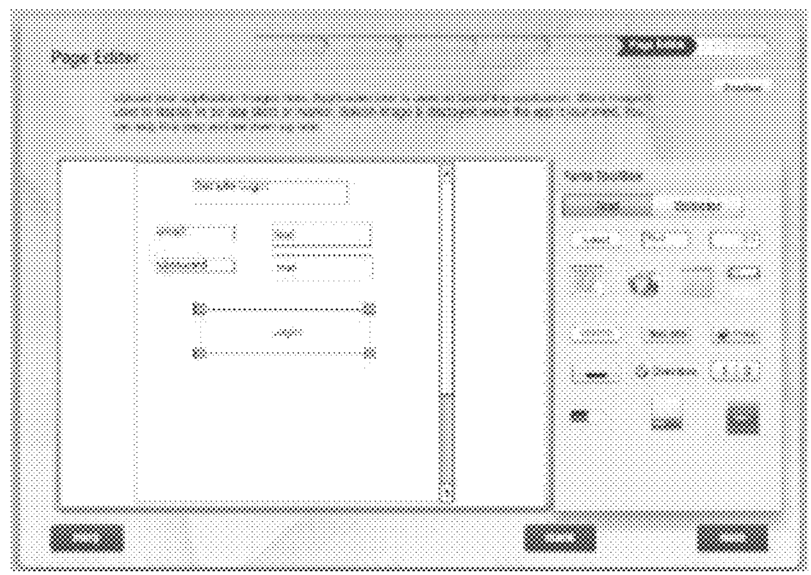
FIG. 5 illustrate screenshot of the page editor user interface that forms part of the wizard based environment that assists the user in creating at least one user interface page for the application.

Referring to FIG. 5 there is shown the Page Editor with the parts toolbox, where each type of page control can be moved and positioned appropriately on to the Page Layout, and then the actions defined for those page-controls.

Figure 6:
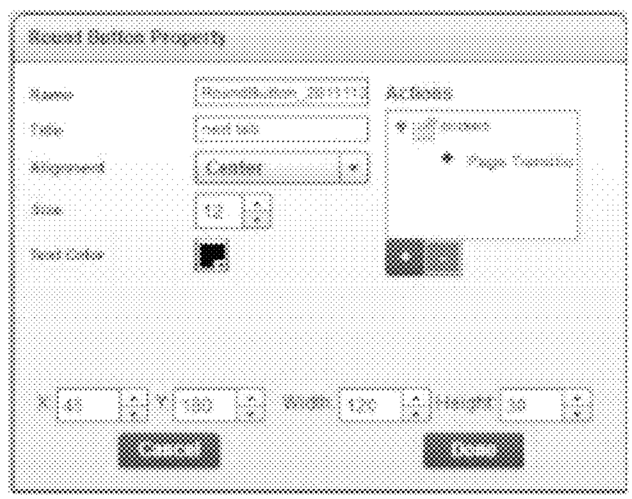
FIG. 6 illustrate screenshot of the user interface using which that forms part of the wizard based environment that assists the user in creating at least one user interface page for the application using which the user can define a reaction to an action.
Figure 7:
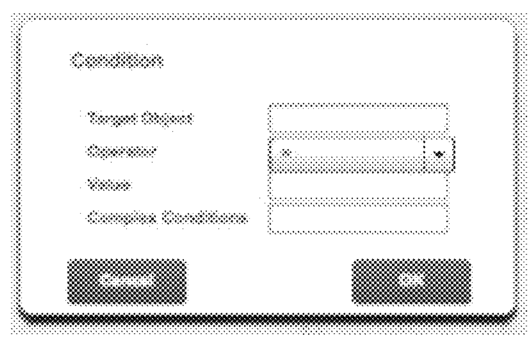
FIG. 7 illustrate screenshot of the user interface that forms part of the wizard based environment that assists the user in creating at least one user interface page for the application using which the user can define a condition for an action.
Figures 8, 9:
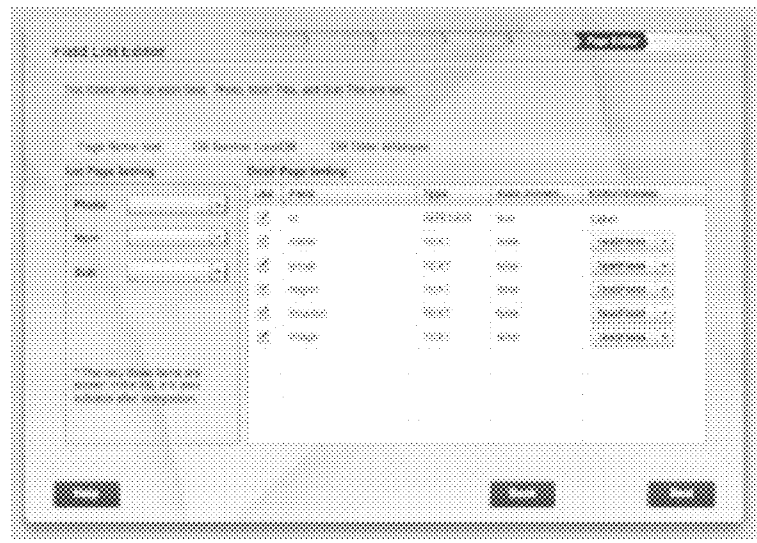
FIG. 8 illustrate screenshot of the field list editor user interface that forms part of the page editor user interface.
FIG. 9 illustrate screenshot of the resource manager user interface that that forms part of the wizard based environment that assists the user in creating at least one user interface page for the application.

Referring to FIGS. 6 and 7 there is shown how events and corresponding actions can be defined specific for each type of UI page control. FIG. 8 shows the Field List Editor which can be used to generate multiple pages by a set of single click actions.

Referring to FIG. 9 there is shown the Resource Manager which is a component of the wizard based mobile application development environment that helps define and collect the resources files—like image and audio and video files, onto the environment so that they can be included with the mobile application. All these resource files thus uploaded are stored on the application development environment to be distributed in binary form when the application is published. The resource file type can be image, video sound, or background music file.

Figure 10:
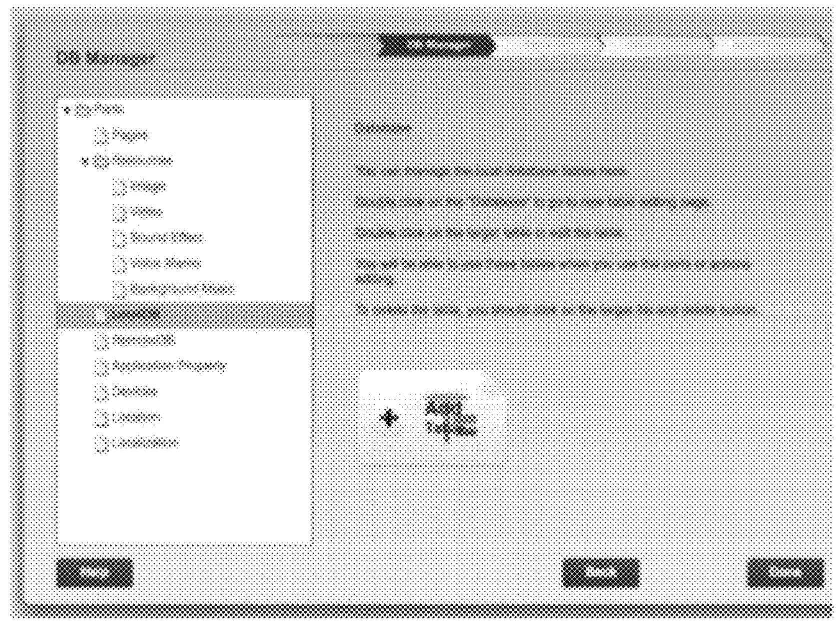
FIG. 10 illustrate screenshot of the database manager user interface that that forms part of the wizard based environment that assists the user in creating at least one user interface page for the application.
Figure 11:
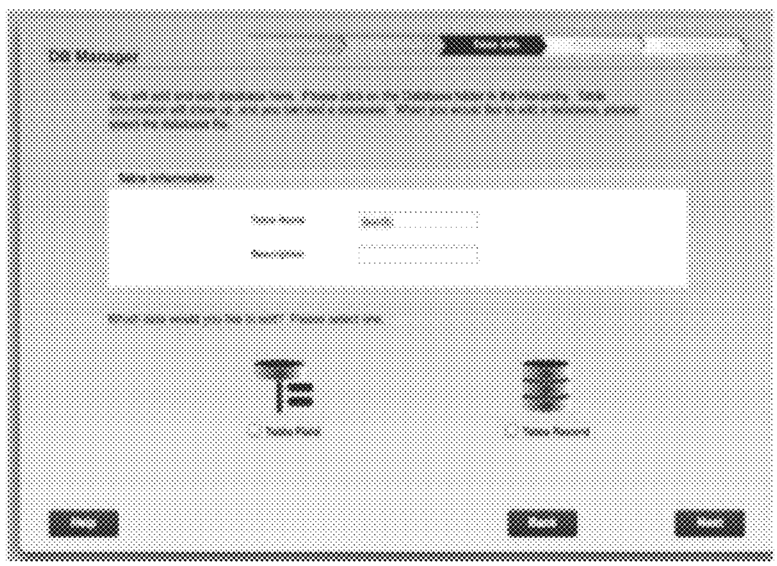
FIG. 11 illustrate screenshot of the database table editor user interface that forms part of the database manager user interface using which the user can edit table information.
Figure 12:
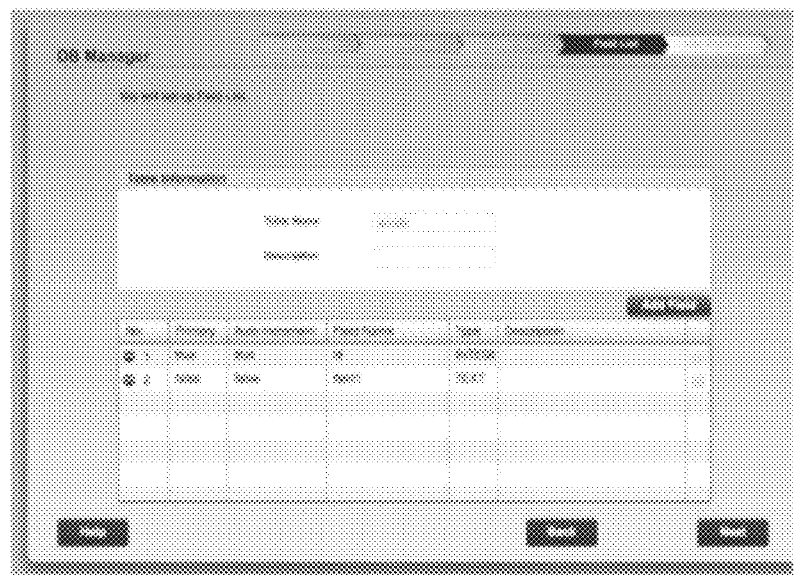
FIG. 12 illustrate screenshot of the database table editor user interface that forms part of the database manager user interface using which the user can edit various fields present in a table.

Referring to FIGS. 10 to 12 there is shown the Database Manager which is a Component of the wizard based mobile application development environment that helps define and collect the data that is stored either in local database with the mobile application or is accessed from a remote location at runtime. First the user chooses to define the Database either as Local or as a Remote Database. The user then defines the database table specifications, down to each database field name, type and size (refer to FIGS. 11 and 12). Then in the case of the local database, the Database manager component is also used to populate the local database table thus defined by uploading the corresponding comma separated file with definition matching the table pre-defined using the Database Manager component.

Figure 13:
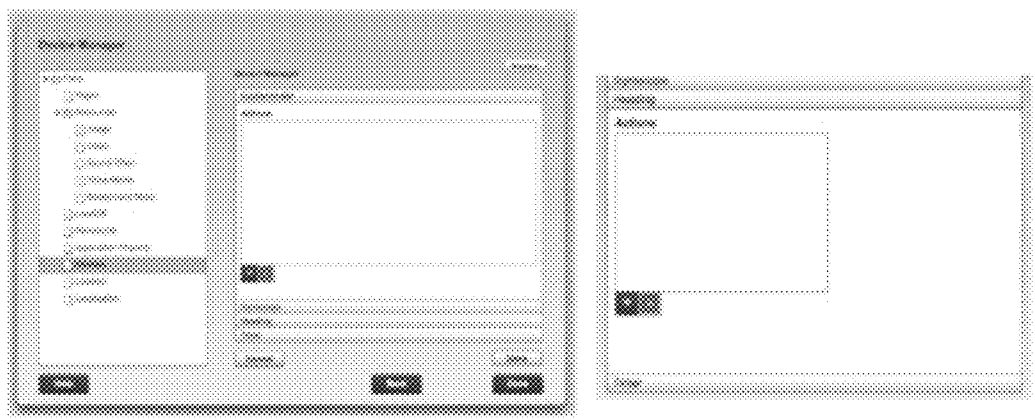
FIG. 13 illustrate screenshot of the device manager user interface that that forms part of the wizard based environment that assists the user in creating at least one user interface page for the application.

Referring to FIG. 13 there is shown the Device Manager which is a component of the wizard based mobile application development environment that helps define the functions of device-level features like gyroscope, compass or accelerometer which will be used by the application thus developed. First the user chooses to define the type of device feature which needs to be defined. The user then defines the feature specifications, including the events and actions corresponding to those events that pertain to the specific device feature.

Figure 14:
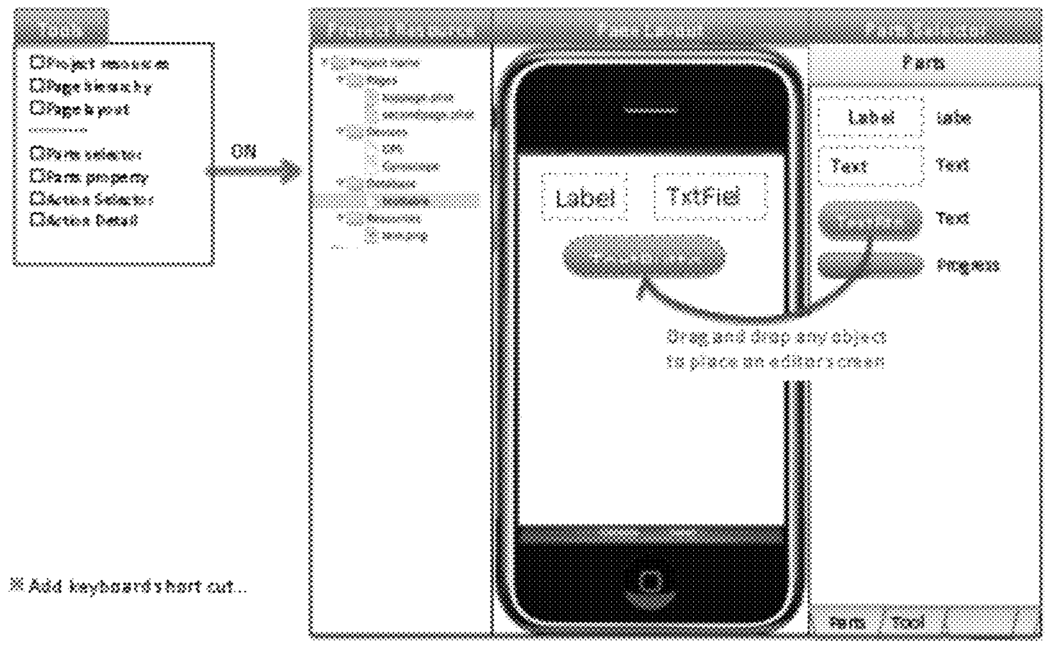
FIG. 14 illustrate screen short of dragging and dropping an object from a part selector to an active work sheet in accordance with an embodiment of the present invention.
Figure 15:
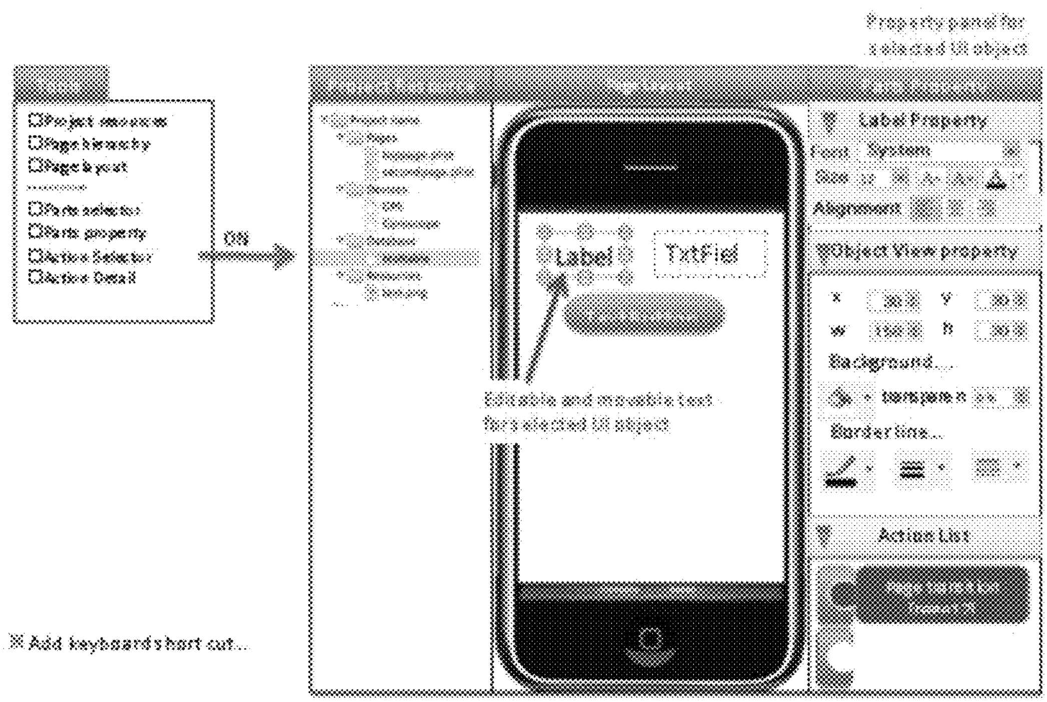
FIG. 15 illustrate screen short of editing the properties of the text appearing in a label object in accordance with an embodiment of the present invention.
Figure 16:
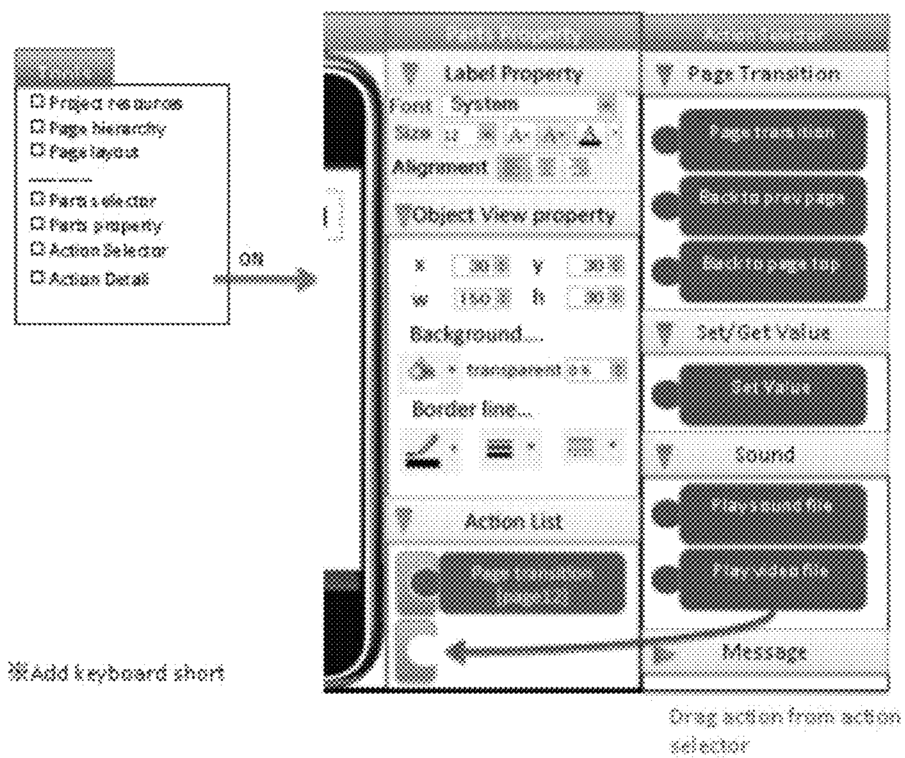
FIG. 16 illustrate screen short of adding events to an action list in accordance with an embodiment of the present invention.
Figure 17:
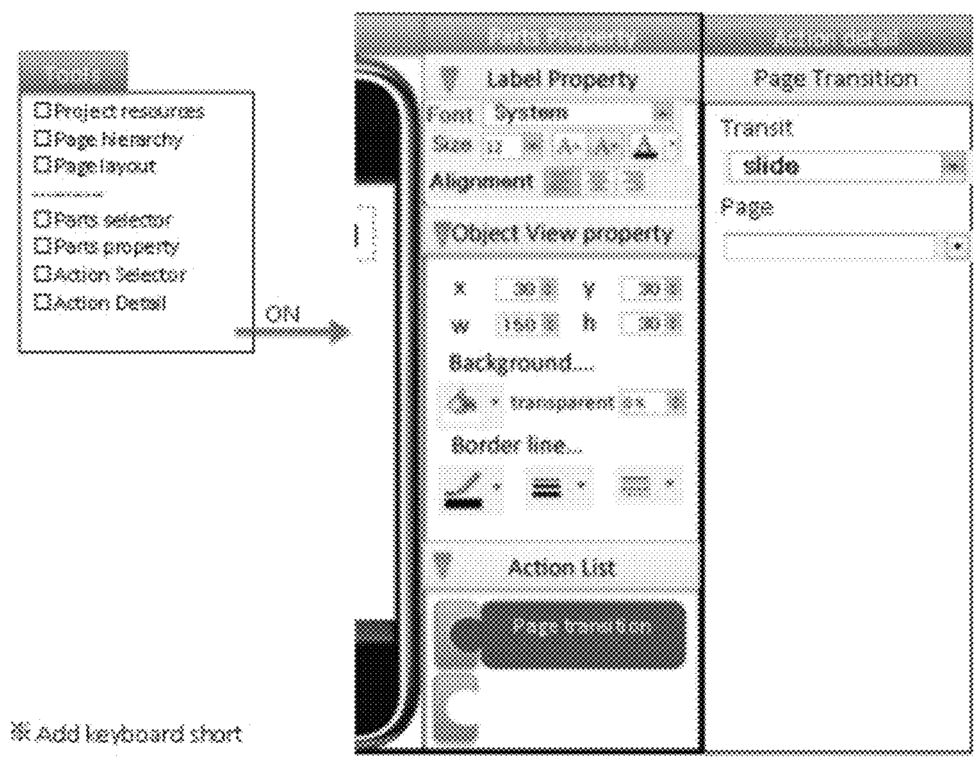
FIG. 17 illustrate screen short of editing properties of an event appearing on an action list in accordance with an embodiment of the present invention.

Referring to FIG. 14 there is illustrated a method of dragging and dropping an object from a part selector to an active work sheet in accordance with an embodiment of the present invention and referring to FIG. 15 there is illustrated a method of editing the properties of the text appearing in a label object which was dragged and dropped (as per FIG. 14). Referring to FIG. 16 there is illustrated a method of adding events to an object which was dragged and dropped as per FIG. 14 and referring to FIG. 17 there is illustrated a method of editing properties of an event appearing on an action list in accordance with an embodiment of the present invention. FIGS. 14 to 17, illustrates the various stages involved in creating the application using the wizard based application development environment. The figures depict how the application definition file is constructed during the building of the application when the layout components and desired flow of each page and function of the mobile application are mapped out using a wizard. The page hierarchy along with their layout is defined and the parts to be used are named and the appropriate properties are also specified. Also, the buttons to be used are chosen and labels to be seen during the running of the application are also described. Everything, right from the action desired is also selected and the details of those actions are prompted and appropriately chosen. The action list which describes the various actions that a user is going to perform is populated by choosing from the action selector. Further, one can also choose the transition of pages which can be either sequential or to specific pages. In addition to the above, keyboard shortcuts are defined and provided wherever necessary. Apart from the above, the parts to be used are defined in detail and the property that is to be invoked for each of these parts is also defined. Some examples of the parts are Labels, TextInput, Image, Picker, etc.

Figure 18:
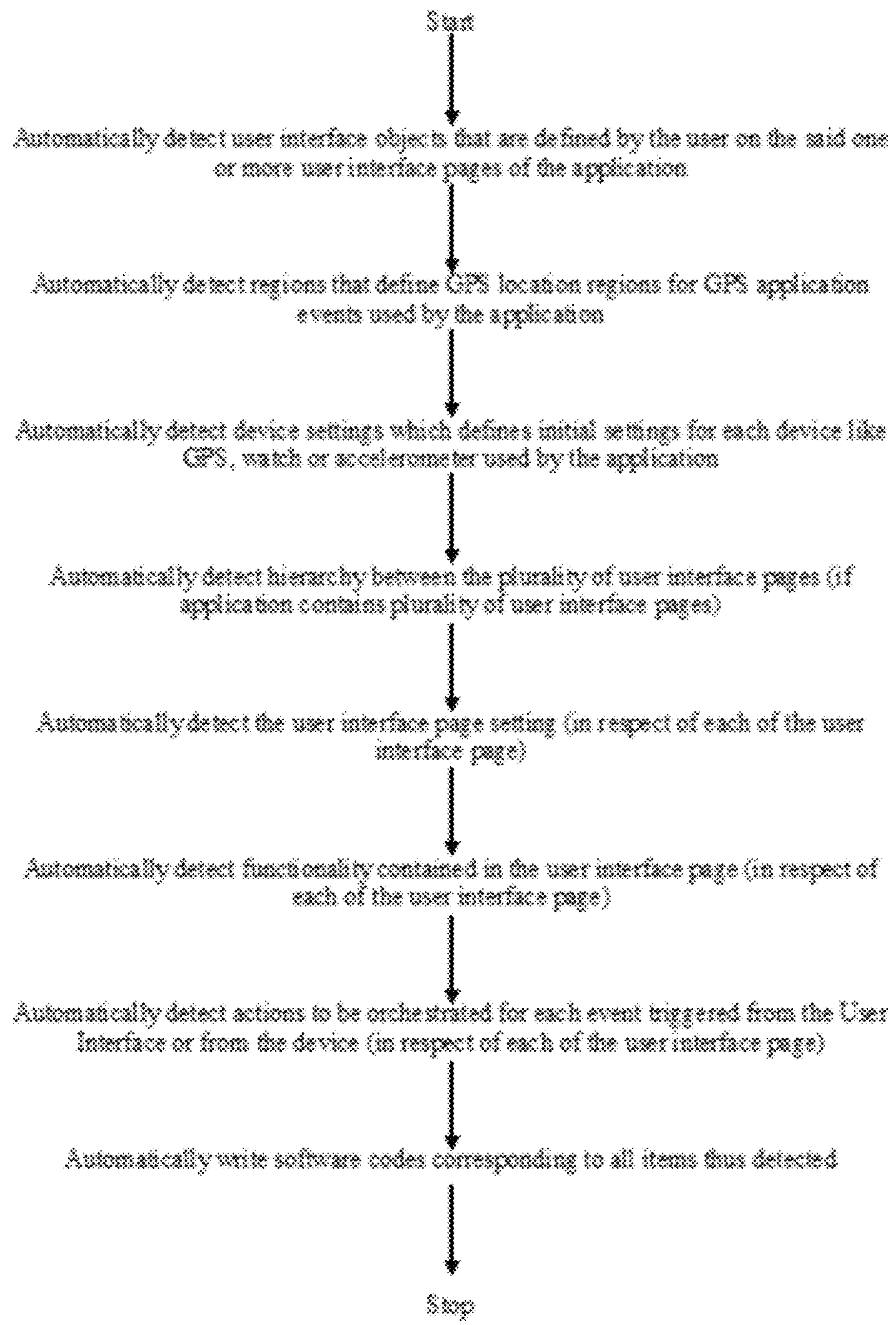
FIG. 18 illustrates the flow chart describing the definition file creation process.

Referring to FIG. 18 there is illustrated the method automatically creates definition file for the application. The said method comprises the steps of:

- automatically detecting user interface objects that are defined by the user on the said one or more user interface pages of the application (step 201);
- automatically detecting regions that define UPS location regions for UPS application events used by the application (step 202);
- automatically detecting device settings which defines initial settings for each device like UPS, watch or accelerometer used by the application (step 203);
- if application contains plurality of user interface pages, automatically detecting hierarchy between the plurality of user interface pages (step 204);
- in respect of each of the user interface page, automatically detecting the user interface page setting (step 205);
- in respect of each of the user interface page, automatically detecting functionality contained in the user interface page (step 206);
- in respect of each of the user interface page, automatically detecting actions to be orchestrated for each event triggered from the User Interface or from the device (step 207); and
- automatically writing software codes corresponding to the items detected in steps 201 to 207 (step 208).

Figure 20:
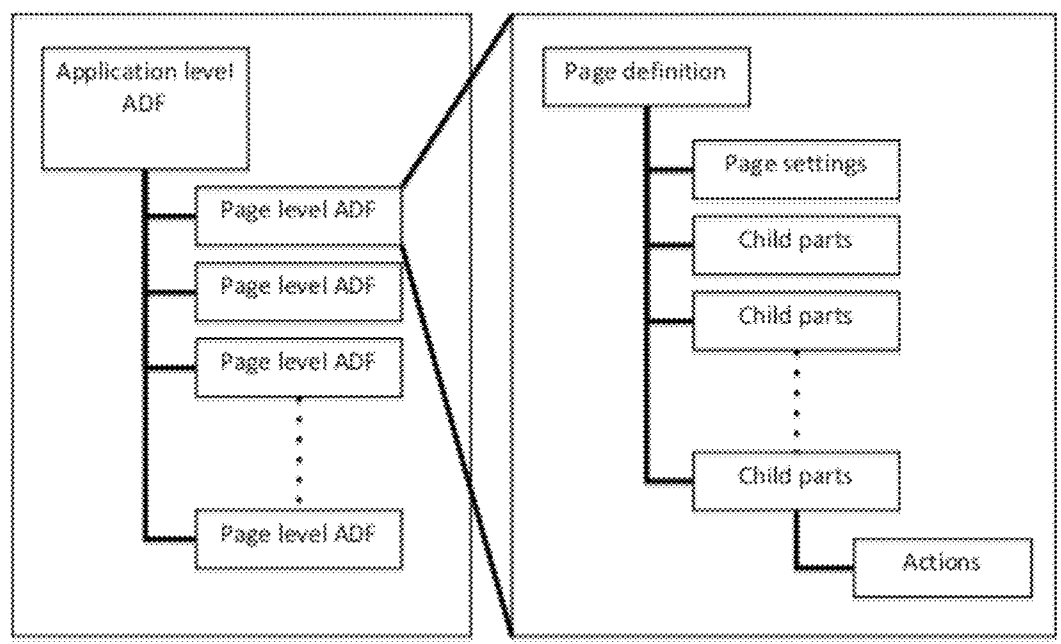
FIG. 20 illustrates the structure of the definition file generated in accordance with the teachings of the present invention.

FIG. 20 illustrates the structure of the definition file generated by following the above described steps in accordance with the teachings of the present invention. Mobile application definition file or definition file is very important and does not depend on any mobile devices or any operating systems and is the core of this invention. This definition file includes the following definitions which are descried in brief:

- "Page Definition Section"—The Section is a part of the Definition File (ADF) that comprises 3 parts—the User Interface (UI) Object Definition, Page Hierarchy Definition, and "Action Definition".
- "Page Hierarchy Definition"—This part defines the page hierarchy to help the developers who build the applications to plan the various page transitions. This part of the Application Definition File (ADF) also specifies the flow and relationship between the different pages or screen views of the Mobile Application.
- "UI Object Definition"—This part of the Application Definition File (ADP) specifies the user interface objects that are defined by the user and set up on one or more specific page of the application.
- "Action Definition"—This part of the Application Definition File (ADF) defines the action to be orchestrated for each event triggered from the User Interface or from the device.
- "Device Setting Definition"—This part of the Application Definition File defines the initial settings for each device like GPS, watch or accelerometer.
- "Region Definition"—This part of the Application Definition File defines the GPS location regions for GPS application events.

Figure 19:
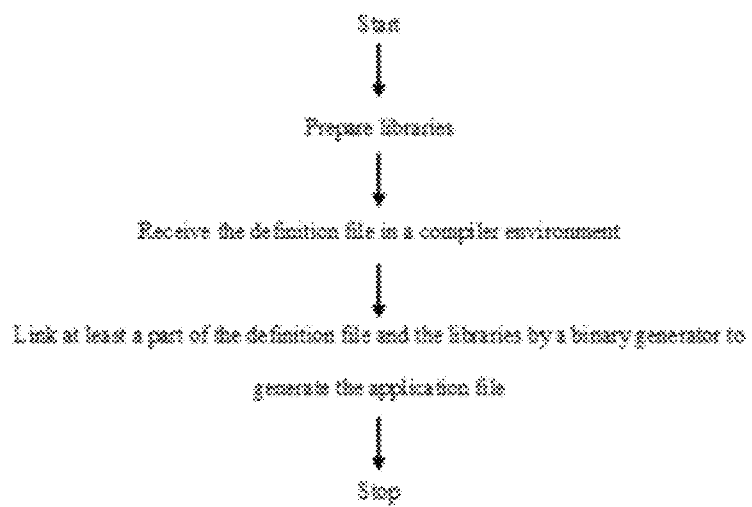
FIG. 19 illustrates the flow chart of the process of combining the contents of the definition file with an operating system specific run-time file.

Once the definition file having the structure as illustrated in FIG. 20 and as described above has been created, the contents of the said definition file is required to be combined with an operating system specific run-time file. Referring to FIG. 19, the step of combining the contents of the definition file with an operating system specific run-time file comprises:

- preparing libraries necessary for linking (step 301);
- receiving the definition file in an compiler environment (step 303); and
- linking at least a part of the definition file and the libraries by a binary generator to generate the application file (step 305).

In still another embodiment, the method of the present invention further comprises, if characteristics of a particular mobile device are not compatible with the contents of the definition file, providing a wizard based environment to a user and allowing the user to interact with the wizard to modify the contents of the definition file.

Figure 21:
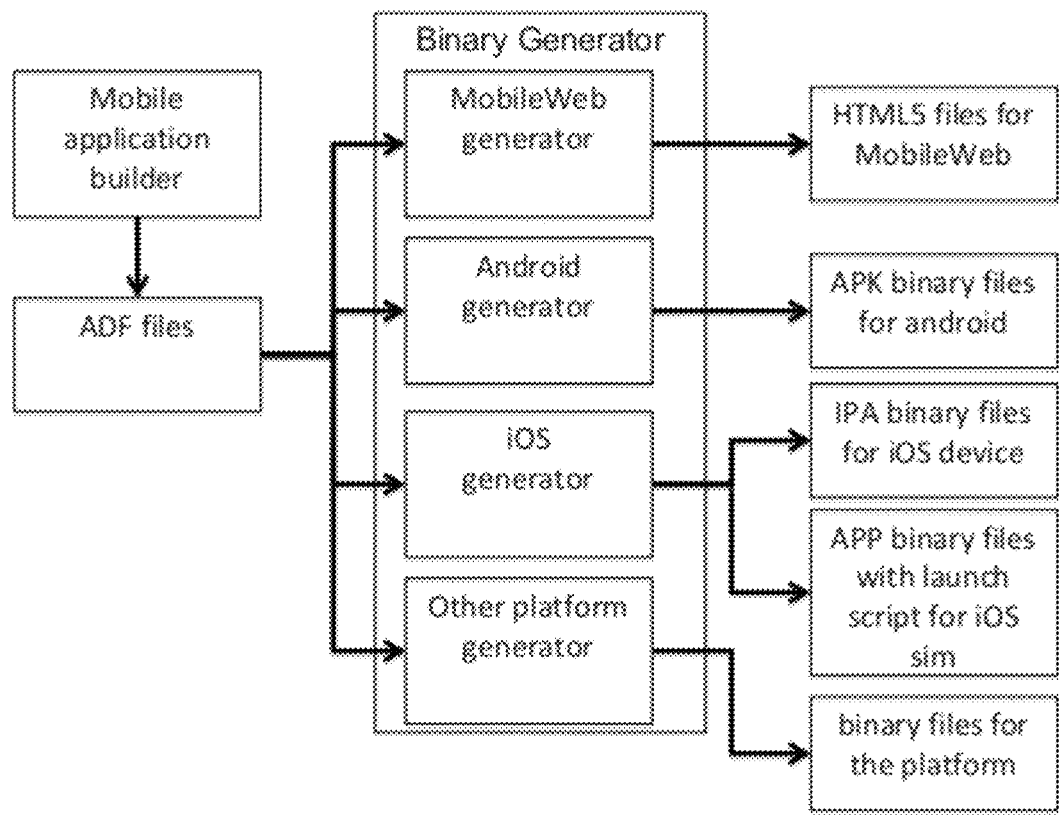
FIG. 21 illustrates block diagram of a system constructed in accordance with the teachings of the present invention.

Referring to FIG. 21, there is illustrated a block diagram of the apparatus (400) of the present invention configured to perform the method described with reference to FIG. 1. The apparatus comprises a module (401) for building mobile application which is configured to assist the developer in building various user interface pages of the mobile application along with the appropriate functionality (as illustrated and described with reference to FIGS. 2 to 17) and thereafter automatically create the definition file by following the method described and illustrated in FIG. 18. The apparatus (400) further comprises a binary generator module (402) for combining the contents of the definition file with an operating system specific run-time file by following the method described and illustrated in FIG. 19.

It can thus be observed that in every phase of development of the application, a simulator is simultaneously provided in the application development environment in order to depict the status of completeness of the mobile application that is being created. At the appropriate stage, the user can test the device on a live mobile device. Once the checklist for completeness verifies, the application build can be completed by delivering the completed application definition file.

Figure 22:
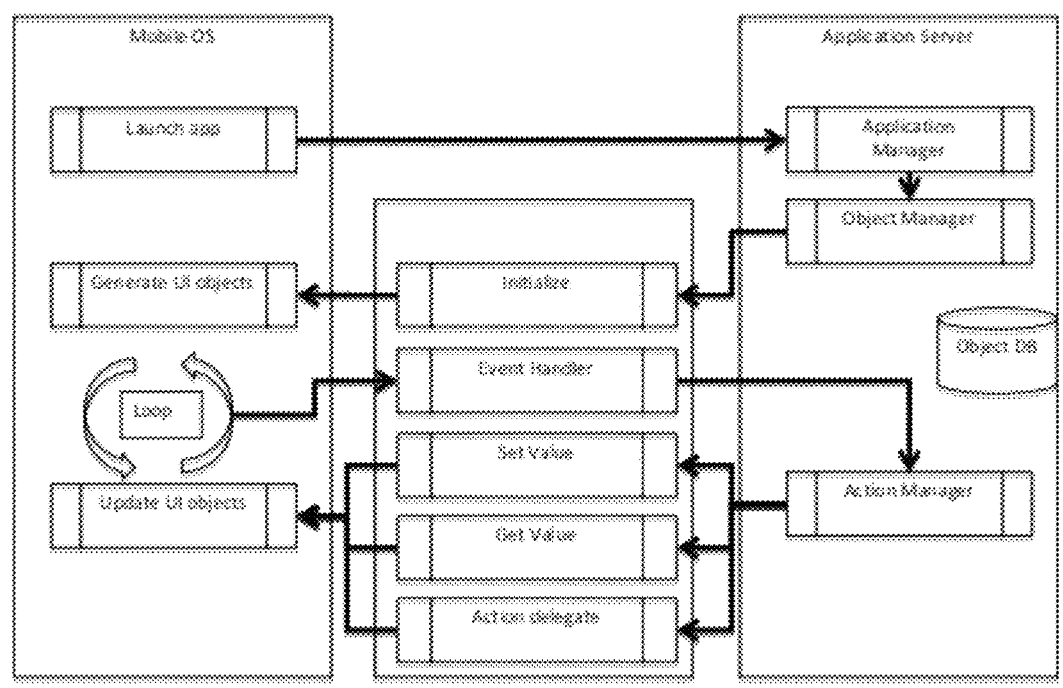
FIG. 22 illustrate the manner in which the mobile application developed in accordance with the teachings of the present invention works.

Referring to FIG. 22, the mobile application thus developed resides in the operating system of the mobile device and interacts with the appropriate application provider's server to perform the desired functionality. By way of example, the application provider's server comprises of one or more modules configured to interact with the mobile application thus developed to provide the appropriate function. In one embodiment, the application provider's server may comprises an AppMgr (hereinafter referred to as Application Manager Module), Object Mgr (hereinafter referred to as Object Manager Module) and ActionMgr (hereinafter referred to as Action Manager Module). Further, the Application Manager comprises an ObjectDB (interchangeably referred to as Object Database) for storing all the User Interface (UI) Objects required during the functioning of the mobile application thus developed.

To begin with, the mobile device in particular, the Operating System of the mobile device issues a request to launch the Application Manager in the said device. On receiving the request, the Application Manager downloads an executable file associated with the Application Manager. Upon downloading, the Application Manager Module analyzes and processes the intermediate file application definition file which is installed at the time of building the application. Due to the presence of this file, the development of the application program of the device-dependent features and OS dependent functions are avoided. The application manager module is configured to build the application at runtime after referring to the application definition file and after initialization, passes control to the object manager module. In order to make the pages and the page-flow of the mobile application, the object manager module is configured to refer to the page definition section of the application definition file. Further, the object manager module is configured to refer the part definition section of the application definition file in order to define the objects of the mobile application from the objects database. The Application Manager is further configured to invoke the initialize function which generates all the user interface (UI) objects on the mobile device. The event handler function then takes over the control and invokes the action manager module present in Application Server which uses the parts definition section and controller definition of the application definition file to control the events and trap the user inputs as per the specific definition of the application made using the build component present in the Application Manager. An example of an event is the "click" event on a button, when this event occurs; the referred sections of the Application Definition File (ADF) are executed. At this juncture, the action manager takes over the control and uses the inputs or values taken from the mobile application user to update the User Interface (UI) Objects and set the values according to the definition. Whenever specific components of the mobile device need to be used, the Action Delegate Function is invoked by the action manager module to control the devices and the library (define what is there in the library). As a result, the hardware dependent functions, like GPS and gyroscope etc., can be controlled. Moreover, all the file manipulations and the database manipulations can be defined and managed by the action manager module using this Controller definition and the developer can construct the mobile application without any the need to write software coding.

At the time of using the Event Handler Function, when the action manager module encounters a stop request from the user interface, the action manager terminates the running of mobile application and clears all temporary, memory allocations, and returns control to the mobile operating system (OS).

Some advantages of this mobile application development environment are as follows:

Allows non technical person to build applications for their business needs;

Cost reduction to a maximum;

The fully automated process drastically reduces the Go-to-Market time by more than 10 times;

It will be appreciated that embodiments of the invention described herein (especially each of the module (401) and the binary generator (402)) may be comprises of one or more conventional processors and unique stored program instructions that control the one or more processors to implement, in conjunction with certain non-processor circuits, some, most, or all of the arbitration functions described herein. Alternatively, some or all of the arbitration functions could be implemented by a state machine that has no stored program instructions or in one or more application specific integrated circuits (ASICs), in which each function or some combinations of certain of the functions are implemented as custom logic.

Of course, a combination of the two approaches could be used. Thus, method and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

The invention claimed is:

1. A method for creating an application for execution on mobile devices, the method comprising:

providing a wizard based environment to a user and allowing the user to interact with a wizard to create at least one user interface page for the application;

detecting an input from the user indicative of completion of the application creation;

automatically creating a definition file for the application, the definition file comprising definitions regarding user interface page hierarchy, user interface page(s), user interface object(s), action(s), device setting(s) and region, comprising:

(a) automatically detecting user interface objects that are defined by the user on the at least one user interface page of the application, (b) automatically detecting regions that define GPS (Global Positioning System) location regions for GPS application events used by the application, (c) automatically detecting device settings which define initial settings for each device including GPS, watch or accelerometer used by the application, (d) if the application contains a plurality of user interface pages, automatically detecting a hierarchy among the plurality of user interface pages, (e) for each user interface page, automatically detecting: a user interface page setting, at least one functionality contained in each user interface page, and actions to be orchestrated for each event triggered from the User Interface or from the device, and (f) automatically writing software codes corresponding to items detected in (a) to (e); and combining the contents of the definition file with an operating system specific run-time file to generate an application file, comprising:

preparing libraries necessary for linking, receiving the definition file in an compiler environment, and linking at least a part of the definition file and the libraries by a binary generator to generate the application file.

2. The method as claimed in claim 1, wherein the wizard based environment allows the user to create the at least one user interface page for the application using a drag-and-drop function.

3. The method as claimed in claim 1, further comprising, if characteristics of a particular mobile device are not compatible with contents of the definition file, providing the wizard based environment to the user and allowing the user to interact with the wizard to modify the contents of the definition file.

4. An apparatus having a processor for creating an application for execution on mobile devices, the apparatus comprising:

a module configured to:

provide a wizard based environment to a user and allowing the user to interact with the wizard to create at least one user interface page for the application;

detect an input from the user indicative of completion of the application creation; and automatically create a definition file for the application, the definition file comprising definitions regarding user interface page hierarchy, user interface page(s), user interface object(s), action(s), device setting(s) and region, comprising:

(a) automatically detecting user interface objects that are defined by the user on the at least one user interface page of the application, (b) automatically detecting regions that define GPS (Global Positioning System) location regions for GPS application events used by the application, (c) automatically detecting device settings which define initial settings for each device including GPS, watch or accelerometer used by the application, (d) if the application contains a plurality of user interface pages, automatically detecting a hierarchy among the plurality of user interface pages, (e) for each user interface page, automatically detecting: a user interface page setting, at least one functionality contained in each user interface page, and actions to be orchestrated for each event triggered from the User Interface or from the device, and (f) automatically writing software codes corresponding to items detected in (a) to (e); and a binary generator module for combining the contents of the definition file with an operating system specific runtime file to generate an application file, comprising:

preparing libraries necessary for linking, receiving the definition file in an compiler environment, and linking at least a part of the definition file and the libraries by a binary generator to generate the application file.

5. The apparatus of claim 4, wherein the wizard based environment allows the user to create the at least one user interface page for the application using a drag-and-drop function.

6. The apparatus of claim 4, wherein the apparatus is further configured to:

provide the wizard based environment to the user; and allow the user to interact with the wizard to modify contents of the definition file if characteristics of a particular mobile device are not compatible with the contents of the definition file.

* * * * *